US009063760B2

(12) United States Patent
Cook et al.

(10) Patent No.: US 9,063,760 B2
(45) Date of Patent: Jun. 23, 2015

(54) EMPLOYING NATIVE ROUTINES INSTEAD OF EMULATED ROUTINES IN AN APPLICATION BEING EMULATED

(75) Inventors: Christopher Cook, San Jose, CA (US); Anthony C. Sumrall, San Jose, CA (US); Thomas A. Thackrey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 13/272,615

(22) Filed: Oct. 13, 2011

(65) Prior Publication Data
US 2013/0096907 A1 Apr. 18, 2013

(51) Int. Cl.
G06F 9/455 (2006.01)

(52) U.S. Cl.
CPC ............ G06F 9/455 (2013.01); *G06F 9/45533* (2013.01); *G06F 9/45537* (2013.01); *G06F 9/45545* (2013.01); G06F 9/4552 (2013.01)

(58) Field of Classification Search
None
See application file for complete search history.

(56) References Cited

U.S. PATENT DOCUMENTS

| 5,574,873 | A | * | 11/1996 | Davidian | 712/200 |
| 5,751,982 | A | * | 5/1998 | Morley | 712/209 |
| 5,781,758 | A | * | 7/1998 | Morley | 703/23 |
| 5,790,825 | A | * | 8/1998 | Traut | 712/209 |
| 5,796,989 | A | * | 8/1998 | Morley et al. | 703/26 |
| 5,953,520 | A | * | 9/1999 | Mallick | 703/26 |
| 5,956,495 | A | * | 9/1999 | Kahle et al. | 703/26 |
| 5,964,889 | A | * | 10/1999 | Nachenberg | 714/25 |
| 5,995,743 | A | * | 11/1999 | Kahle et al. | 703/21 |
| 6,009,261 | A | | 12/1999 | Scalzi et al. | |
| 6,031,992 | A | * | 2/2000 | Cmelik et al. | 717/138 |
| 6,442,752 | B1 | | 8/2002 | Jennings et al. | |
| 6,834,391 | B2 | * | 12/2004 | Czajkowski et al. | 719/328 |
| 6,907,519 | B2 | | 6/2005 | Desoli | |
| 6,934,945 | B1 | * | 8/2005 | Ogilvy | 718/1 |
| 7,124,237 | B2 | | 10/2006 | Overton et al. | |
| 7,275,246 | B1 | | 9/2007 | Yates, Jr. et al. | |
| 7,555,592 | B1 | * | 6/2009 | Koryakin et al. | 711/6 |
| 7,739,100 | B1 | * | 6/2010 | Muttik et al. | 703/26 |
| 8,099,274 | B2 | * | 1/2012 | Bohizic et al. | 703/23 |
| 8,151,352 | B1 | * | 4/2012 | Novitchi | 726/24 |

(Continued)

FOREIGN PATENT DOCUMENTS

GB 2426840 A 12/2006

OTHER PUBLICATIONS

"z/Architecture—Principles of Operation," IBM Publication No. SA22-7832-08, Ninth Edition, Aug. 2010, pp. 1-1496.

(Continued)

*Primary Examiner* — Kibrom K Gebresilassie
(74) *Attorney, Agent, or Firm* — Steven Chiu, Esq.; Blanche E. Schiller, Esq.; Heslin Rothenberg Farley & Mesiti P.C.

(57) ABSTRACT

Processing within an emulated computing environment is facilitated. Code used to implement system-provided (e.g., standard or frequently used) routines referenced in an application being emulated is native code available for the computing environment, rather than emulated code. Responsive to encountering a reference to a system-provided routine in the application being emulated, the processor is directed to native code, rather than emulated code, even though the application is being emulated.

18 Claims, 5 Drawing Sheets

(56) References Cited

U.S. PATENT DOCUMENTS

| | | | |
|---|---|---|---|
| 8,285,987 B1* | 10/2012 | Kimball et al. | 713/164 |
| 8,312,202 B1* | 11/2012 | Koryakin et al. | 711/6 |
| 8,364,461 B2* | 1/2013 | Bohizic et al. | 703/23 |
| 8,428,930 B2* | 4/2013 | Bohizic et al. | 703/26 |
| 8,447,583 B2* | 5/2013 | Bohizic et al. | 703/23 |
| 8,510,756 B1* | 8/2013 | Koryakin et al. | 719/318 |
| 2002/0099930 A1* | 7/2002 | Sakamoto et al. | 712/227 |
| 2002/0156977 A1* | 10/2002 | Derrick et al. | 711/118 |
| 2003/0093649 A1* | 5/2003 | Hilton | 712/41 |
| 2003/0101334 A1* | 5/2003 | Desoli | 712/227 |
| 2003/0101431 A1 | 5/2003 | Duesterwald et al. | |
| 2004/0015972 A1 | 1/2004 | Barclay | |
| 2004/0243986 A1* | 12/2004 | Nishiyama | 717/139 |
| 2005/0086451 A1* | 4/2005 | Yates et al. | 712/32 |
| 2007/0234358 A1* | 10/2007 | Hattori et al. | 718/1 |
| 2007/0288682 A1* | 12/2007 | Czajkowski et al. | 711/2 |
| 2008/0177989 A1* | 7/2008 | Mitran et al. | 712/227 |
| 2008/0243465 A1* | 10/2008 | Bohizic et al. | 703/23 |
| 2008/0270740 A1* | 10/2008 | Wang et al. | 711/206 |
| 2009/0204785 A1* | 8/2009 | Yates et al. | 711/205 |
| 2009/0249049 A1* | 10/2009 | Weissman et al. | 712/238 |
| 2011/0071815 A1* | 3/2011 | Bohizic et al. | 703/26 |
| 2011/0071816 A1* | 3/2011 | Bohizic et al. | 703/26 |
| 2011/0112820 A1* | 5/2011 | Bohizic et al. | 703/26 |
| 2011/0153307 A1* | 6/2011 | Winkel et al. | 703/26 |
| 2011/0154079 A1* | 6/2011 | Dixon et al. | 713/323 |
| 2012/0144167 A1* | 6/2012 | Yates et al. | 712/216 |
| 2012/0159469 A1* | 6/2012 | Laor | 717/173 |
| 2013/0096908 A1 | 4/2013 | Cook | |

OTHER PUBLICATIONS

Combined Search and Examination Report under Sections 17 and 18(3) for GB1218074.1 dated Feb. 25, 2013, pp. 1-6.

Office Action for U.S. Appl. No. 13/684,336, dated Oct. 18, 2013, pp. 1-18.

Final Office Action for U.S. Appl. No. 13/684,336, dated May 16, 2014, 13 pages.

* cited by examiner

EMPLOYING NATIVE ROUTINES INSTEAD OF EMULATED ROUTINES IN AN APPLICATION BEING EMULATED

BACKGROUND

An aspect of the present invention relates, in general, to emulated computing environments, and in particular, to facilitating processing within such environments.

Emulated computing environments allow a processor of one particular system architecture to emulate applications written for other system architectures that differ from the one particular system architecture. The processor that is performing the emulation is referred to as the native processor which executes native code (i.e., code written for that architecture). To emulate an application, the processor translates code from the architecture in which the application is written to equivalent code in the architecture of the processor, and then executes the translated code. This translated code is often referred to as emulated code.

While emulation provides a number of advantages, performance is often affected, since it takes time to translate code into translated native code.

BRIEF SUMMARY

The shortcomings of the prior art are overcome and additional advantages are provided through the provision of a computer program product for facilitating processing within an emulated computing environment. The computer program product comprises a storage medium readable by a processing circuit and storing instructions for execution by the processing circuit for performing a method. The method includes, for instance, identifying, by a processor that is based on one system architecture, one or more system-provided routines referenced within an application written for another system architecture different from the one system architecture, the application to be emulated by the processor, and wherein the identifying identifies one or more defined routine names or one or more defined routine signatures; and responsive to identifying a system-provided routine, providing native code for the system-provided routine instead of emulated code for the system-provided routine.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for facilitating processing within an emulated computing environment. In one example, the code used to implement standard or frequently used routines (e.g., subroutines, functions, modules, services, instructions, code, etc.) referenced in an application being emulated is not emulated code, but instead, native code available for the computing environment. The standard or frequently used routines are, for instance, system-provided routines, which are routines provided by, for instance, the system, compiler, operating system, etc. They are those routines, such as a sort, print or copy routine, a mathematical function, or GetMain service, as examples, that come standard with the operating system or other system components.

In one example, when reference to a system-provided (also referred to herein as standard or frequently used) routine is encountered in the application being emulated, the processor executing the application is directed to a routine written in native code, rather than a routine that includes emulated code. By replacing system-provided routines in emulated code with functionally equivalent routines in native code, the execution time of the combined native code and emulated code is less than that of all emulated code.

Figure 1:
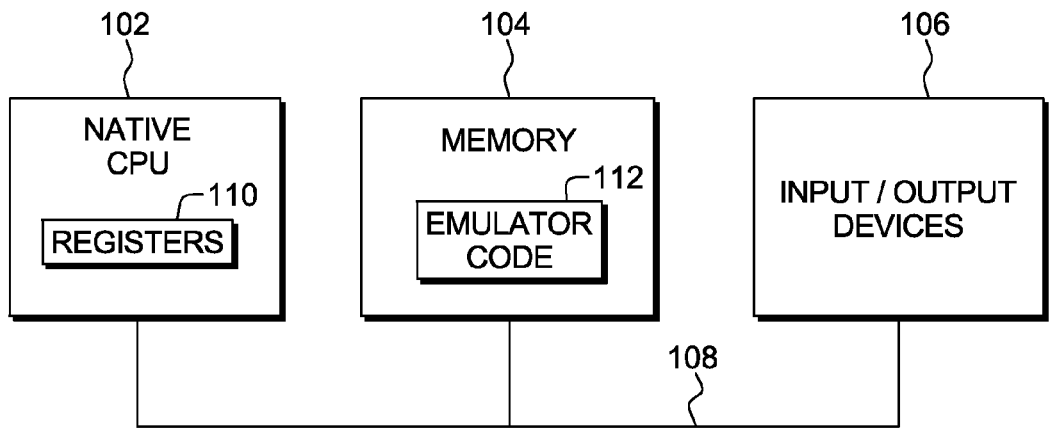
FIG. 1 depicts one embodiment of a computing environment to incorporate and use one or more aspects of the present invention.

One embodiment of a computing environment to incorporate and use one or more aspects of the present invention is described with reference to FIG. 1. In this example, a computing environment 100 is based on one system architecture, which may be referred to as a native architecture, but emulates another system architecture, which may be referred to as a guest or non-native architecture. The native architecture differs from the guest architecture. For instance, the native architecture may have a different instruction set than the guest architecture, or one or more of its hardware components may be different. In a further example, the native architecture may have one or more processors that execute one or more operating systems that differ from operating systems executed by processors of the guest architecture.

As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-08, August 2010, which is hereby incorporated herein by reference in its entirety.

Computing environment 100 includes, for instance, a native processor 102 (e.g., a central processing unit (CPU)), a memory 104 (e.g., main memory) and one or more input/output (I/O) devices or interfaces 106 coupled to one another via, for example, one or more buses 108. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes emulator code 112 stored in memory 104. This code enables the computing environment configured in one architecture to emulate another architecture. For instance, emulator code 112 allows machines based on architectures other than the z/Architecture®, such as pSeries® servers, to emulate the z/Architecture® and to execute code (e.g., software and instructions) developed based on the z/Architecture®.

Further details relating to emulator code 112 (a.k.a., emulator) are described with reference to FIG. 2. In one example, emulator code 112 includes a fetching routine 200 to obtain guest code (i.e., non-native code) 202 (e.g., one or more guest instructions, routines or code) from memory 104, and to optionally provide local buffering for the obtained code. Guest code was developed to be executed in an architecture other than that of native CPU 102. For example, guest code 202 may have been designed to execute on a z/Architecture® processor, but instead is being emulated on native CPU 102, which may be, for instance, a pSeries® server.

Emulator 112 also includes a translation routine 204 to determine the type of guest code that has been obtained and to translate the guest code into corresponding native code 208 (e.g., one or more native instructions, routines or other code). This translation includes, for instance, identifying the function to be performed by the guest code and choosing the native code to perform that function. The native code that is provided responsive to translation is referred to herein as translated code or emulated code.

Further, emulator 112 includes an emulation control routine 206 to cause the translated code to be executed. Emulation control routine 206 may cause native CPU 102 to execute a routine of native code that emulates previously obtained guest code and, at the conclusion of such execution, to return control to the fetching routine to emulate the obtaining of the next guest code. Execution of native code 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest code 202, native code 208, and emulator code 112 may reside in the same memory or may be dispersed among different memory devices. As used herein, firmware includes, e.g., the microcode, millicode and/or macrocode of the processor (or entity performing the processing). It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Figure 2:
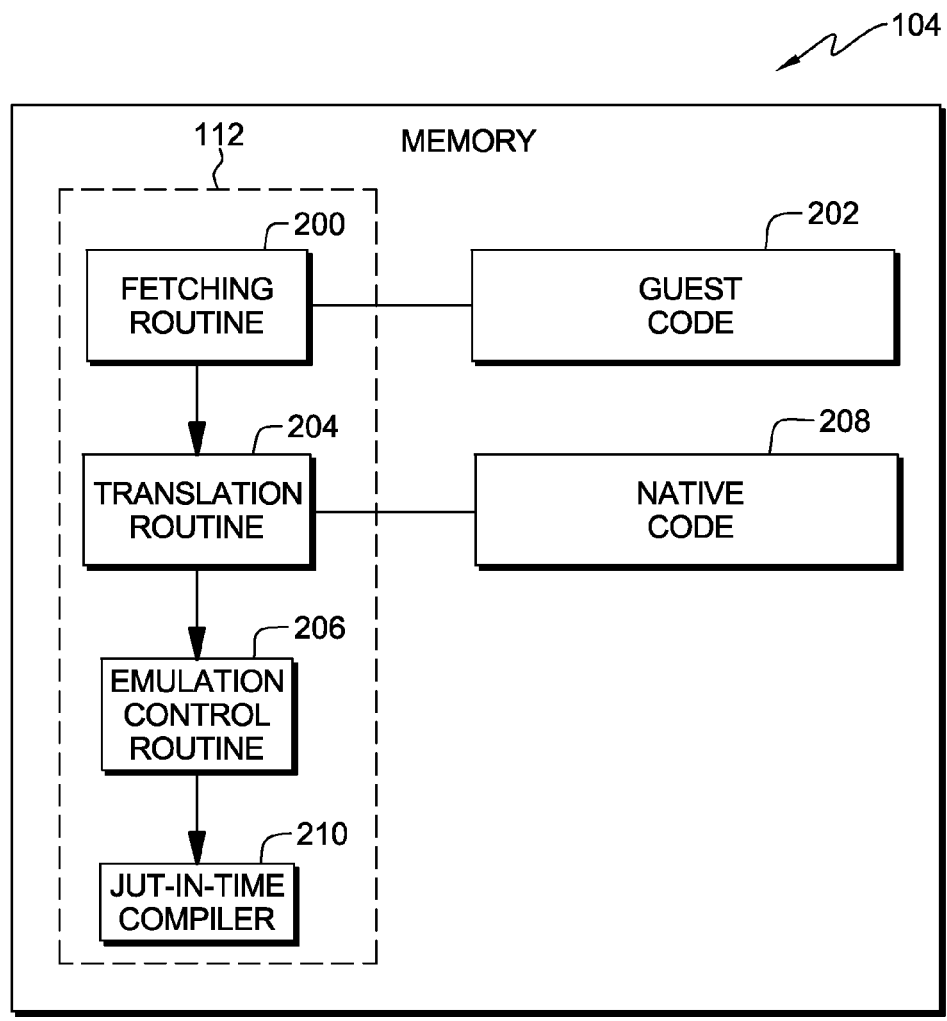
FIG. 2 depicts further details of one embodiment of the memory of FIG. 1, in accordance with an aspect of the present invention.

Continuing with FIG. 2, optionally, an accumulation of code that has been processed by the fetch and control routines is further provided, in one embodiment, to a Just-In-Time compiler 210. The Just-In-Time compiler is a dynamic compiler that examines the accumulated code, looks for opportunities to remove redundancies and generates a matching sequence of code on the native platform on which the emulator is running While the emulator has visibility to, for instance, one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y. JAVA is a trademark of Sun Microsystems, Inc., Santa Clara, Calif.

Figure 3:
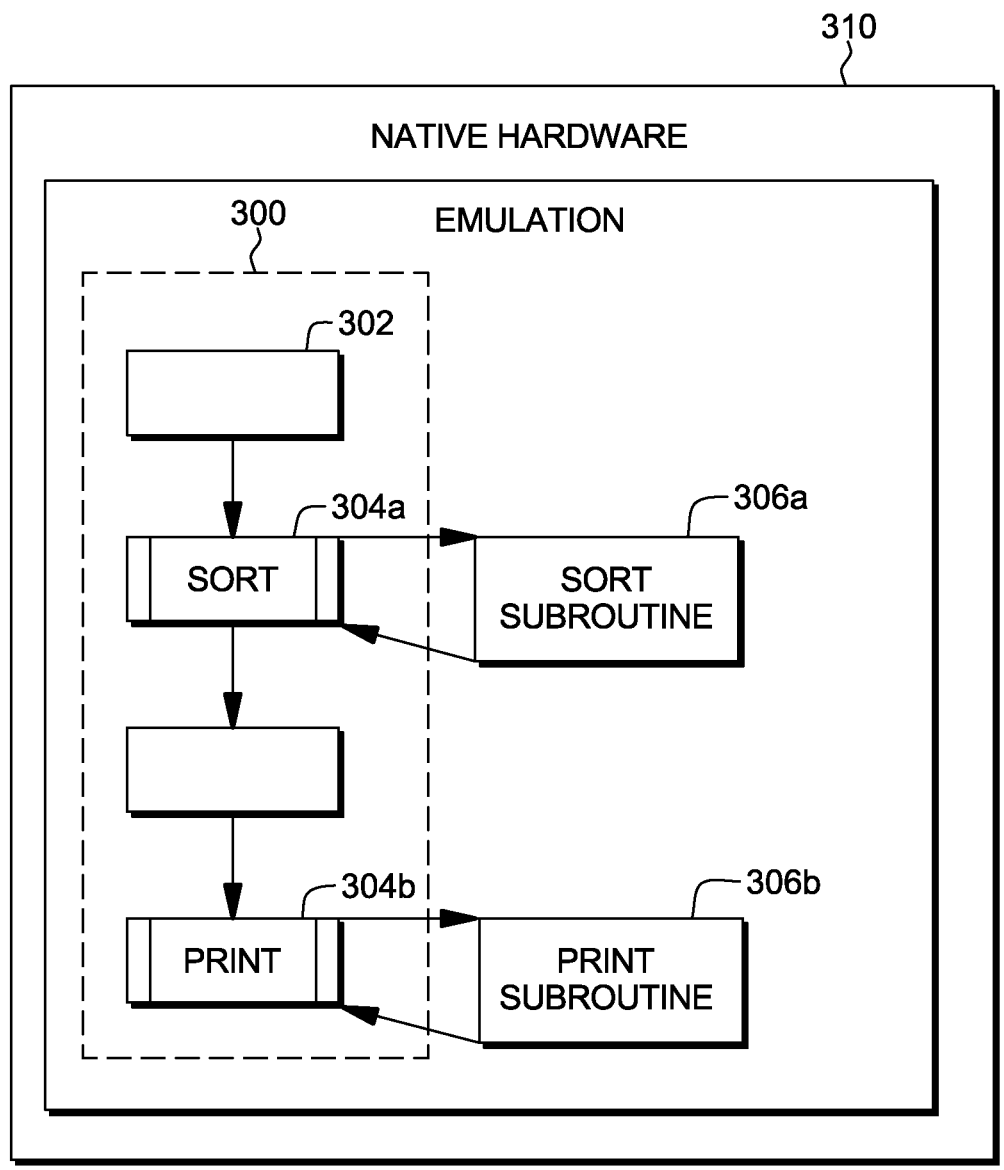
FIG. 3 depicts one example of an application being emulated, including system-provided subroutines referenced by the application.

One example of an application (a.k.a., application program) being emulated is depicted in FIG. 3. An application may include one or more programs, one or more code segments, one or more lines of code or any combination thereof, as examples. The use of the term application is not meant to be limiting in any way. In this example, an application 300 is being emulated by native hardware 310 (e.g., employing emulator code 112), and includes, for instance, one or more code segments 302. As an example, a code segment includes one or more lines of code to be executed, and a line of code includes, for instance, an instruction, a function, a call or other invocation to a routine, or any other code to be executed. As with the term application, the phrases code segment and lines of code are not meant to be limiting in any way. In one example, one or more of the code segments invoke system-provided (e.g., standard or conventional routines), such as a sort subroutine or a print subroutine.

During execution of the application, when a reference to a routine is encountered, such as a call to a subroutine, a pointer or other information is used to locate the routine (i.e., code to implement the routine), which is then executed. After execution of the called routine, processing continues in the main-line application 300. For instance, when reference to a sort subroutine 304a is encountered, information, such as a pointer, is used to locate and execute sort subroutine code 306a, which is located external to the main-line application. Thereafter, processing returns to the call sort subroutine line in the main-line application, and execution of the main-line application continues. During this execution, reference to one or more other routines may be encountered, such as reference to print subroutine 304b. As with the sort subroutine, when reference to the print subroutine is reached, information points to print subroutine code 306b, which is executed. Processing then returns to the call of the print subroutine. In this example, each of the subroutines (e.g., sort, print) is emulated, similar to the main-line application. That is, the code to implement each of the subroutines is generated either at the time of the call or previously and stored for later execution by obtaining the guest code for the subroutine and translating it into equivalent native code, in a known manner.

The native processor executing the emulated application, in one embodiment, has no knowledge of or access to the source code of the application, no ability to re-link or re-compile the application, and generally has no visibility into the system being emulated.

Figure 4:
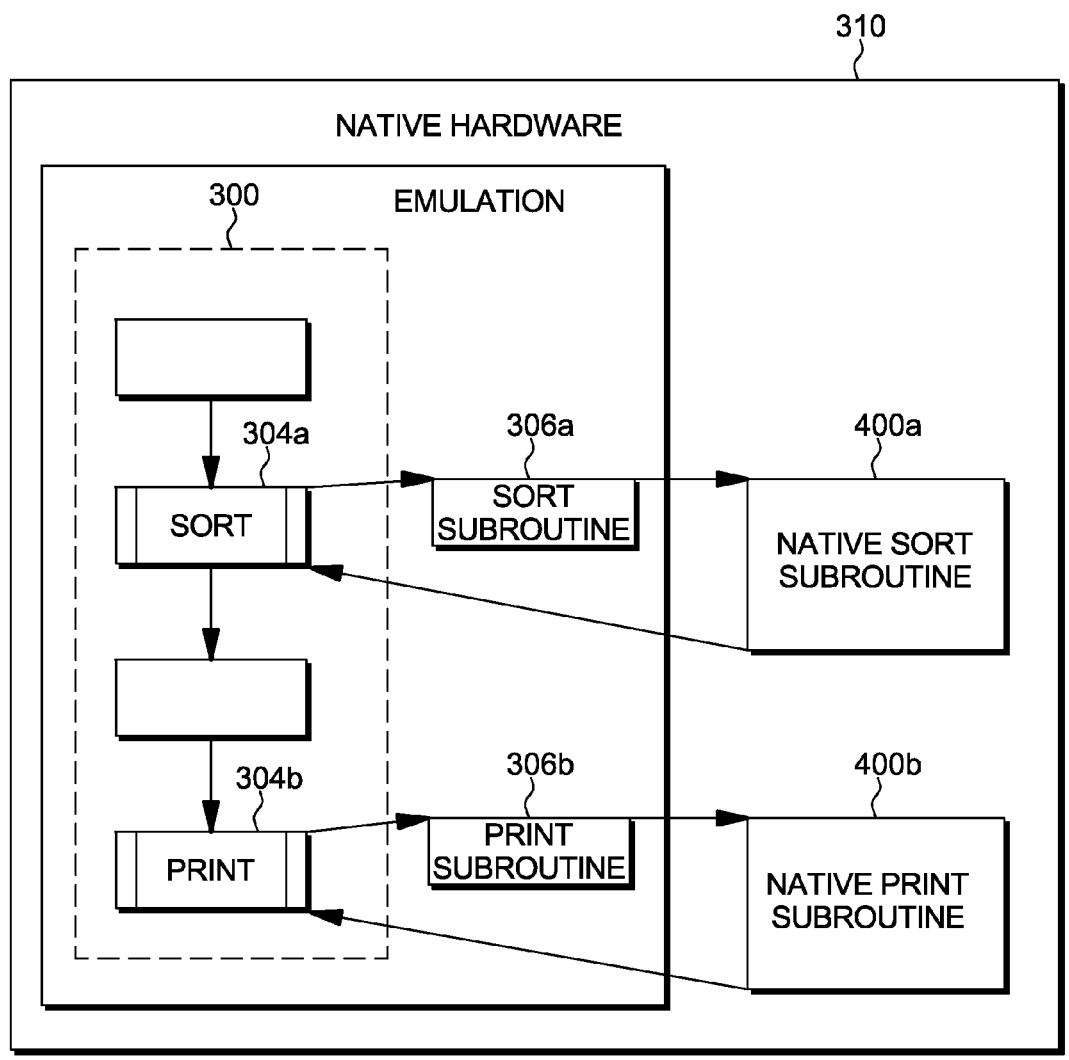
FIG. 4 depicts another example of the application of FIG. 3, but in this example, instead of emulating the system-provided subroutines, available native code is used for the subroutines, in accordance with an aspect of the present invention.

To facilitate processing in an emulated environment, in accordance with an aspect of the present invention, instead of emulating the routines to provide translated native code, non-translated native code is used, as depicted in FIG. 4. In the example depicted in FIG. 4, the same application, application 300, is being emulated by native hardware 310. However, in this instance, when reference to a system-provided routine is encountered, instead of executing an emulated subroutine, a native routine is executed. For instance, when reference to sort subroutine 304a is encountered in application 300, instead of executing emulated sort routine code 306a, native sort routine code 400a is executed. Similarly, when reference to print subroutine 304b is encountered, instead of executing emulated print subroutine code 306b, a native print subroutine code 400b is executed.

That is, in one embodiment, the emulator code does not translate the routine provided for the guest architecture to provide a translated native routine, but instead, locates a native routine provided for the native architecture and employs that routine. This saves on translation costs associated with translating the routine. In yet a further embodiment, even if the translated routine is provided, the native routine (i.e., the non-translated routine) is still used. To employ the native routine, a pointer or other information associated with invoking the routine is updated to point to the native subroutine. After execution of the native routine, execution continues in the main-line application.

One embodiment of the logic associated with employing native routines, instead of emulated routines, in an application being emulated is described with reference to FIG. 5. In one example, this logic is executed by emulator code 112. It may be performed during execution of the application; or after the application is loaded for execution, but prior to execution of the application. In the example below, it is performed during execution of the application.

Figure 5:
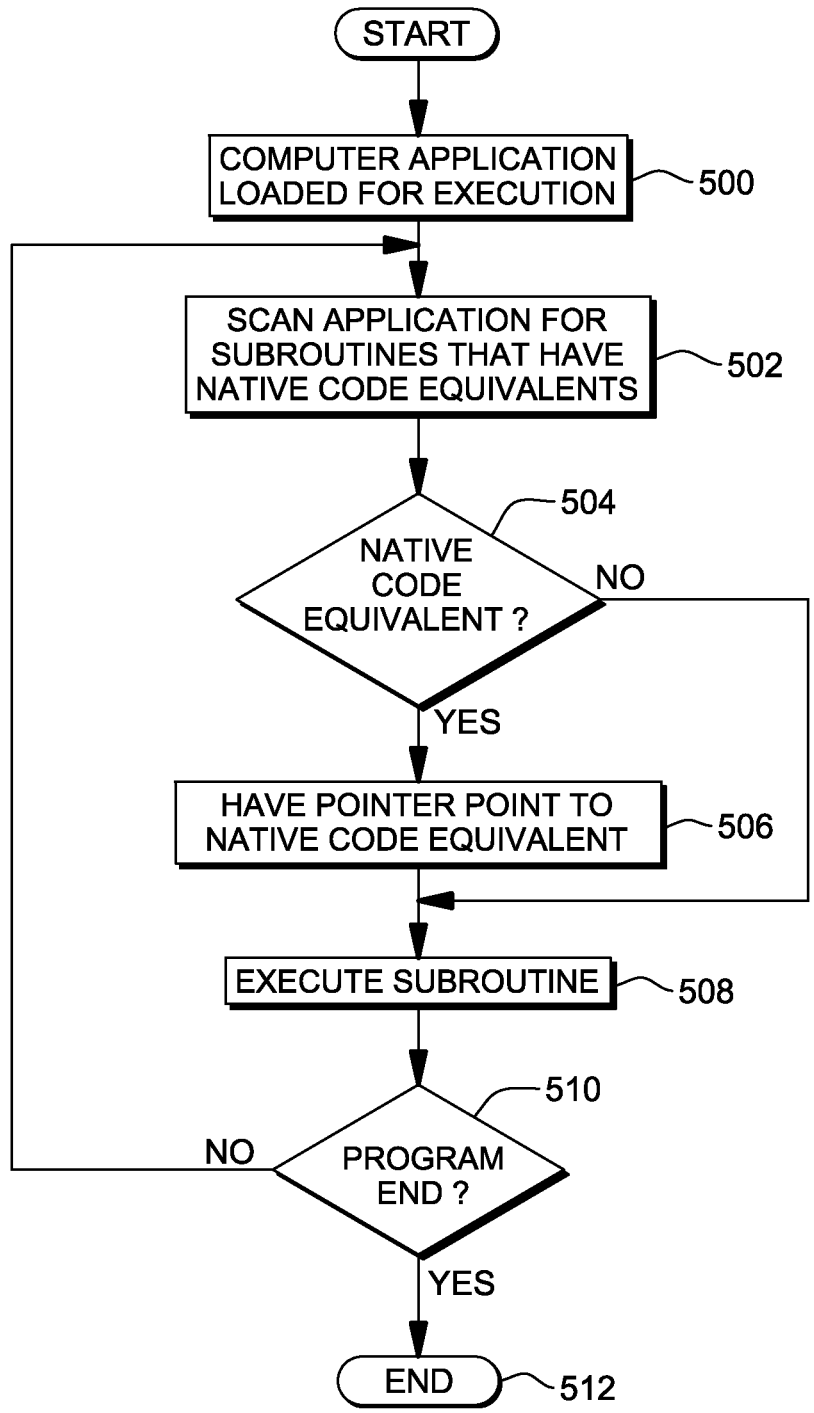
FIG. 5 depicts one example of the logic to provide available native code, instead of translated native code, for an application being emulated, in accordance with an aspect of the present invention.

Referring to FIG. 5, initially, a computer application is loaded for execution, STEP 500. In this example, the application is written for a guest architecture and is to be emulated by a processor having a native architecture.

During execution, the application (e.g., the load or object module) is scanned for routines that have native code equivalents, STEP 502. For instance, the application is scanned looking for patterns that identify system-provided (e.g., standard or conventional) routines (e.g., subroutines, functions, modules, services, instructions, code, etc.). That is, the scanning process (which is, for instance, part of the translation routine of the emulator, or in another embodiment, separate therefrom) scans the application looking for a word, symbol, abbreviation or other pattern associated with a routine that it recognizes and understands may have an equivalent native routine. The scanning process uses one or more techniques for detecting system-provided routines. These techniques include, for instance:

Searching for particular subroutine names which are placed in the load module by the linkage editor or binder. For instance, the scanning process is provided a list of one or more names to search for in the application. Examples include, but are not limited to, sort, print, copy, square root, etc. Many possibilities exist;

Searching subroutine signatures which are eye-catchers or binary sequences which uniquely identify the subroutine itself (in this case, the scanner is to follow the link to the subroutine to identify it). Again, the scanning process is provided a list of eye-catchers or binary sequences that are to be searched; or Scanning calling signatures which are encoded by the compiler or assembler and which uniquely identify the called subroutine or function. For example, the calling sequence for GETMAIN includes a unique SVC instruction that identifies the GETMAIN function as the target of the calling sequence, and a search is performed on SVC. Many other examples are possible.

Assuming a reference to a system-provided routine is identified, a determination is made as to whether a native code equivalent is available for the identified system-provided routine, INQUIRY 504. This is determined, for instance, by searching libraries, repositories, memory, storage, etc., for a native routine having a pattern that matches or is similar to the pattern identified by the scanning process. For instance, if a reference to a subroutine is encountered in the application that has a pattern identifying a call to a sort subroutine, then a search is performed for a native sort routine that can be used. If a native code equivalent is available, then a pointer is used to indicate the subroutine to be executed is the native code equivalent, instead of the emulated code. In one example, the emulated code is not even generated. The native code subroutine is then executed, and processing returns to the call of the subroutine, STEP 508. Thereafter, if the application has not reached its end, INQUIRY 510, then processing continues with STEP 502. Otherwise, execution is complete, STEP 512.

Returning to INQUIRY 504, if a native code equivalent is not available, then the emulated code for the routine is executed, STEP 508, and processing continues with INQUIRY 510. In one example, the emulated code is generated responsive to there being no native code equivalent. In a further example, it is previously generated and stored for later use.

Described in detail above is a capability for using native code routines, instead of emulated routines, in applications that are otherwise being emulated. In a further embodiment, if a native routine is found, the application is revised to point to the native code, so next time the application is executed, it need not perform the scan and search for equivalent code. In one example, a flag is set to indicate that the scan and search are not needed.

In one or more aspects, a capability is provided that accepts any random piece of code being emulated, scans it and tries to identify system-provided routines for which native code is already available, and executes that native code.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware one or more aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
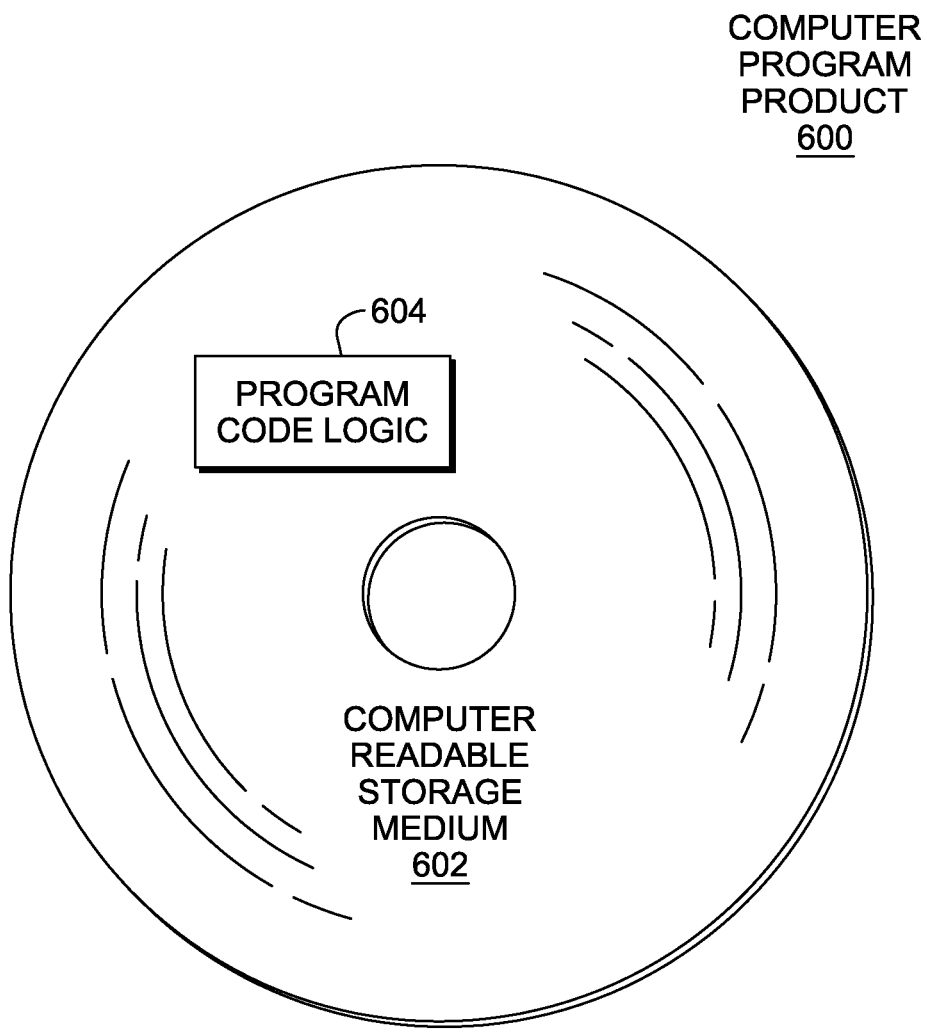
FIG. 6 depicts one embodiment of a computer program product incorporating one or more aspects of the present invention.

Referring now to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For instance, the computing environment can be based on architectures other than Power4, PowerPC® or Intel®, and can emulate architectures other than the z/Architecture®. Additionally, servers other than pSeries® servers can incorporate and use one or more aspects of the present invention. Moreover, other techniques may be used to identify those routines that may have native code equivalents. Additionally, various emulators can be used. Emulators are commercially available and offered by various companies. Many other types of computing environments can incorporate and/or use one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing within an emulated computing environment, said computer program product comprising:

a non-transitory computer readable storage medium readable by a processing circuit and storing instructions for execution by the processing circuit for performing a method comprising:

identifying, by a processor that is based on one system architecture, one or more system-provided routines referenced within an application written for another system architecture different from the one system architecture, the another system architecture having a different instruction set than the one system architecture, the application to be emulated by the processor, in which at least one or more portions of code of the application written for the another system architecture is to be translated into equivalent code of the one system architecture, and wherein the identifying identifies one or more defined routine names or one or more defined routine signatures of the one or more system-provided routines; and based on identifying a system-provided routine in the application written for the another system architecture, determining whether a native code equivalent is available for the identified system-provided routine, and based on determining that the native code equivalent is available, using a pointer to point to the native code equivalent, wherein native code is provided for the system-provided routine instead of emulated code for the system-provided routine, the native code comprising non-translated native code, wherein the native code for the system-provided routine is not native code that has been translated by emulator code, and wherein the system-provided routine is a routine that is included with a system component as a standard routine of the system component, and wherein the system-provided routine comprises a sort routine, a print routine, a copy routine. a mathematical function or a GETMAIN service.

2. The computer program product of claim 1, wherein the identifying comprises scanning the application during execution of the application by the processor for the one or more system-provided routines, the scanning searching for at least one of the one or more defined routine names or the one or more defined routine signatures.

3. The computer program product of claim 2, wherein the one or more defined routine signatures comprise at least one of one or more signatures created by linkage or one or more calling signatures encoded by a compiler or assembler.

4. The computer program product of claim 3, wherein a calling signature of the one or more calling signatures comprises a supervisory call.

5. The computer program product of claim 1, wherein the identifying comprises scanning the application subsequent to being loaded for execution but prior to execution for the one or more system-provided routines.

6. The computer program product of claim 1, wherein the determining whether the native code equivalent is available comprises searching one or more of libraries, repositories, memory or storage for a native routine having a pattern at least similar to a pattern identified by a scanning process used to identify the system-provided routine.

7. A computer system for facilitating processing within an emulated computing environment, said computer system comprising:
   a memory; and
   a processor in communications with the memory, wherein the computer system is configured to perform a method, said method comprising:
      identifying, by a processor that is based on one system architecture, one or more system-provided routines referenced within an application written for another system architecture different from the one system architecture, the another system architecture having a different instruction set than the one system architecture, the application to be emulated by the processor, in which at least one or more portions of code of the application written for the another system architecture is to be translated into equivalent code of the one system architecture, and wherein the identifying identifies one or more defined routine names or one or more defined routine signatures of the one or more system-provided routines; and
      based on identifying a system-provided routine in the application written for the another system architecture, determining whether a native code equivalent is available for the identified system-provided routine, and based on determining that the native code equivalent is available, using a pointer to point to the native code equivalent, wherein native code is provided for the system-provided routine instead of emulated code for the system-provided routine, the native code comprising non-translated native code, wherein the native code for the system-provided routine is not native code that has been translated by emulator code, and wherein the system-provided routine is a routine that is included with a system component as a standard routine of the system component, and wherein the system-provided routine comprises a sort routine, a print routine, a copy routine, a mathematical function or a GETMAIN service.

8. The computer system of claim 7, wherein the identifying comprises scanning the application during execution of the application by the processor for the one or more system-provided routines, the scanning searching for at least one of the one or more defined routine names or the one or more defined routine signatures.

9. The computer system of claim 8, wherein the one or more defined routine signatures comprise at least one of one or more signatures created by linkage or one or more calling signatures encoded by a compiler or assembler.

10. The computer system of claim 9, wherein a calling signature of the one or more calling signatures comprises a supervisory call.

11. The computer system of claim 7, wherein the identifying comprises scanning the application subsequent to being loaded for execution but prior to execution for the one or more system-provided routines.

12. The computer system of claim 7, wherein the determining whether the native code equivalent is available comprises searching one or more of libraries, repositories, memory or storage for a native routine having a pattern at least similar to a pattern identified by a scanning process used to identify the system-provided routine.

13. A method of facilitating processing within an emulated computing environment, said method comprising:
   identifying, by a processor that is based on one system architecture, one or more system-provided routines referenced within an application written for another system architecture different from the one system architecture, the another system architecture having a different instruction set than the one system architecture, the application to be emulated by the processor, in which at least one or more portions of code of the application written for the another system architecture is to be translated into equivalent code of the one system architecture, and wherein the identifying identifies one or more defined routine names or one or more defined routine signatures of the one or more system-provided routines; and
   based on identifying a system-provided routine in the application written for the another system architecture, determining whether a native code equivalent is available for the identified system-provided routine, and based on determining that the native code equivalent is available, using a pointer to point to the native code equivalent, wherein native code is provided for the system-provided routine instead of emulated code for the system-provided routine, the native code comprising non-translated native code, wherein the native code for the system-provided routine is not native code that has been translated by emulator code, and wherein the system-provided routine is a routine that is included with a system component as a standard routine of the system component, and wherein the system-provided routine comprises a sort routine, a print routine, a copy routine, a mathematical function or a GETMAIN service.

14. The method of claim 13, wherein the identifying comprises scanning the application during execution of the application by the processor for the one or more system-provided routines, the scanning searching for at least one of the one or more defined routine names or the one or more defined routine signatures.

15. The method of claim 14, wherein the one or more defined routine signatures comprise at least one of one or more signatures created by linkage or one or more calling signatures encoded by a compiler or assembler.

16. The method of claim 15, wherein a calling signature of the one or more calling signatures comprises a supervisory call.

17. The method of claim 13, wherein the determining whether the native code equivalent is available comprises searching one or more of libraries, repositories, memory or storage for a native routine having a pattern at least similar to a pattern identified by a scanning process used to identify the system-provided routine.

18. The method of claim 13, wherein the identifying comprises scanning the application subsequent to being loaded for execution but prior to execution for the one or more system-provided routines.

* * * * *